June 29, 1926.
J. B. HARRIS
VEHICLE SPRING CONTROLLER
Filed Sept. 8, 1925
1,590,579
2 Sheets-Sheet 1
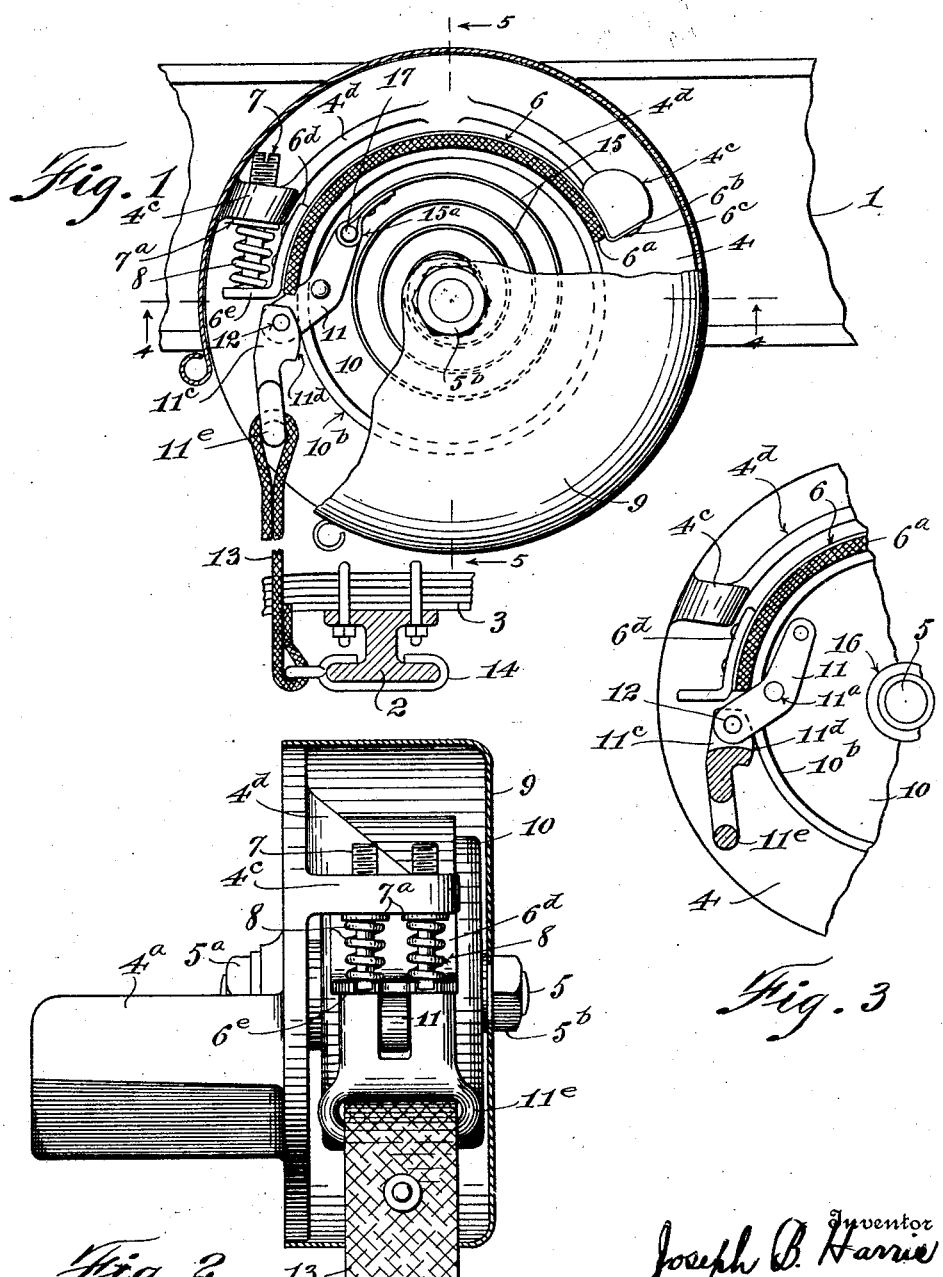

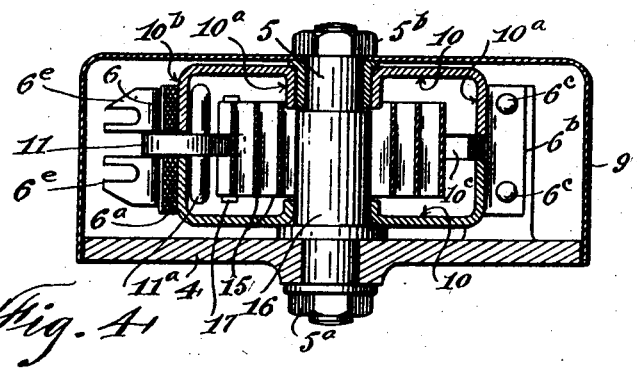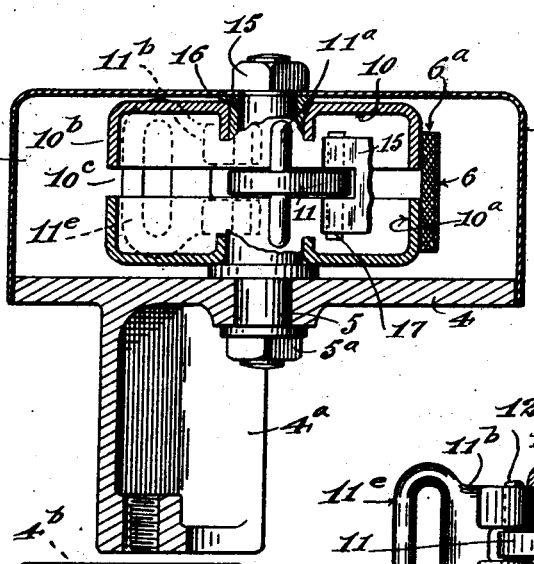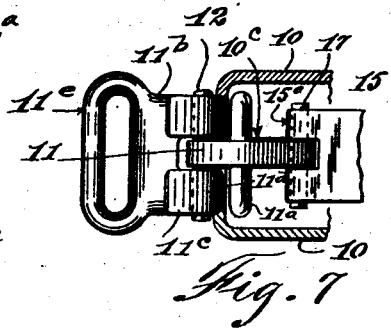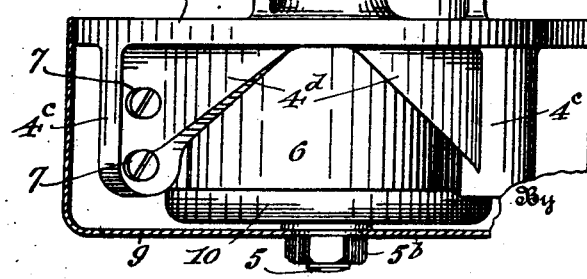

Patented June 29, 1926.

1,590,579

UNITED STATES PATENT OFFICE.

JOSEPH B. HARRIS, OF CLEVELAND, OHIO, ASSIGNOR TO THE HARRIS SPRING BRAKE COMPANY, OF CLEVELAND, OHIO, A CORPORATION OF OHIO.

VEHICLE SPRING CONTROLLER.

Application filed September 8, 1925. Serial No. 54,863.

My invention relates to improvements in vehicle spring controllers, and more particularly to mechanism of this type for modifying or controlling the action of the vehicle springs, the present improvements being directed to that class of vehicle spring controllers exemplified in my application filed April 25, 1925, Serial No. 25,756. As described in said application, my improved device is adapted to be applied to a vehicle in such a way as to permit the free yielding of the springs under compression stresses while modifying and controlling the reflex action or rebound of the vehicle carried by such springs.

The primary object of my invention is to provide a generally improved rebound check of the type indicated, which will be exceedingly simple in construction and efficient in use, as well as one in which the parts are so constructed and arranged relative to each other as to reduce the liability to breakage or disarrangement to the minimum.

A further and important object is the provision of an improved controller of this type in which the various parts are so arranged and disposed relative to each other as to automatically compensate for wear on the friction bearing surfaces without materially lessening the pressure or resistance between such surfaces, as well as one in which the pressure between the friction bearing surfaces may be adjusted or varied, as desired, to compensate for the varying loads to be carried by the vehicle springs.

A still further and important object is the provision of an improved drum actuating clutch extending through the split portion of the circumferentially split brake drum and provided with relatively fixed and movable clutch elements or members adapted to intermittently engage with the inner and outer peripheries of the brake drum in intermittently engaging and releasing said brake drum, the relatively movable or outer clutch member being adapted to cooperate with the inner or fixed clutch element in automatically compensating for wear and in adjusting itself to the varying exigencies of actual service.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a side elevation of the front portion of a vehicle chassis frame and front axle and interposed vehicle spring, equipped with a controller constructed and connected in accordance with this invention.

Fig. 2, an end elevation of the same, one half of the surrounding housing being removed for the purpose of clearer illustration of the parts.

Fig. 3, a fragmentary view of the drum actuating clutch and brake shoe portions of the controller, the connecting and adjusting members being omitted for the purpose of clearer illustration of the adjacent parts.

Fig. 4, a central horizontal sectional view, taken on line 4—4 of Fig. 1.

Fig. 5, a central vertical sectional view taken substantially on line 5—5 of Fig. 1, the section of the controller unit being, however, in this instance reversed or transposed about in a reversed position to that shown when attached as in Fig. 1.

Fig. 6, a fragmentary top plan view of the same, detached, the upper portion of the casing or housing being removed for the purpose of clearer illustration of the parts.

Fig. 7, a fragmentary underside view of the drum actuating clutch, illustrating in particular its relation to the circumferentially split brake drum.

Similar numerals of reference designate like parts throughout all the figures of the drawings.

The improved controller comprises relatively fixed and movable brake or clutch members, one being connected to the spring suspended vehicle body, such for example,— as the vehicle chassis frame or side bar 1, and the other being connected to a relatively movable vehicle part, such for example,—as the axle 2, carrying the adjacent vehicle supporting spring 3, as illustrated in Fig. 1 of the drawings.

As a means of providing a suitable support or bearing block for the various working parts and conveniently connecting an assembled controller unit to a relatively fixed part of the vehicle, as for example,—the chassis side bar 1, a bearing block 4 is provided, said block being provided with a bearing axle or spindle 5.

As a convenient means of attaching the block 4 to the inner side of the chassis side bar (where a front type of controller unit is employed, as in the present instance) one side of the bearing block is provided with a channel shaped bracket 4ª, adapted to extend beneath the chassis side bar and to be connected thereto through a suitable bolt or fastening element extending through the bolt receiving opening 4ᵇ.

As a means of removably mounting and securing the relatively fixed clutch or brake member to the bearing block 4, the latter is provided with clutch or brake shoe carrying abutments 4ᶜ, spaced apart and arranged near the upper portion of the block 4, said abutments, in the present instance, being rigidly connected and braced by means of interposed web or brace members 4ᵈ.

The relatively fixed clutch or brake is preferably in the specific form of a brake shoe comprising a brake liner carrying section 6 and a brake liner 6ª, the latter being secured thereto in a well known and understood manner. The segmental shoe or section 6 is provided at one end with a radially extending lug 6ᵇ, connected to one of the abutments 4ᶜ, by means of fastening elements 6ᶜ. The liner carrying section 6 is preferably formed of suitable flexible metallic material and is provided at one end with a carrying bracket 6ᵈ, the latter being provided with a pair of slotted lugs 6ᵉ, (see Fig. 2) to receive the ends of adjusting screws 7, threaded in one of the abutments 4ᶜ, said screws 7 being preferably provided with annular flanges or shoulders 7ª, engaging with surrounding coiled or cushioning springs 8, interposed between the lug or abutment 4ᶜ and the lugs 6ᵉ of the adjustable shoe. By adjusting the shoe 7 it will be readily understood that the brake shoe may be adjusted, thereby regulating the tension of the liner 6ª on the relatively movable or rotatably mounted clutch or brake drum, hereinafter referred to, and the construction referred to also causes the brake or clutch member to automatically take up any wear of the brake liner.

As a convenience in manufacture and assembly of parts, the spindle 5, is in the specific form of a bolt removably mounted in a boss opening of the block 4 by means of a nut 5ª, suitable means being provided for preventing the rotation of the spindle or bolt 5. As a means of enclosing the various working parts after being assembled, a surrounding housing or casing 9, is provided, said casing being provided with a central opening receiving the end of the spindle 5 and being secured upon the block by means of a nut 5ᵇ.

The relatively movable clutch or brake drum is rotatably mounted on the axle or spindle 5, and as a convenient means of mounting and assembling the parts, and particularly the interior convolute spring and drum actuating clutch, hereinafter referred to, the brake drum is made up of two complementary or companion members 10, having interior bearing flanges 10ª, forming the bearing opening for the spindle 5, the outer portions of the companion members 10 being provided with inturned rim forming flanges 10ᵇ. The rim portions 10ᵇ are spaced apart forming a circumferentially split brake drum, the recess portion 10ᶜ, forming a guide for the brake drum actuating clutch or shank 11.

As a means of intermittently actuating and progressively advancing the circumferentially split brake drum 10 with each rebound of the vehicle springs and the spring suspended vehicle chassis, the guide or stem portion 11 of the clutch is provided with a fixed clutch element or member 11ª, adapted to slide within and to intermittently engage the inner periphery of the brake drum, the outer end of the guide or stem 11 being provided with a pivoted clutch member 11ᵇ, adapted to intermittently engage with the exterior of said drum members and to cooperate with said fixed clutch element 11ª in intermittently engaging and releasing said brake drum. The pivoted or rocker clutch member 11ᵇ is provided with spaced lugs 11ᶜ, connected to the outer end of the clutch shank 11 by means of the cross pin 12, the inner sides of the lugs 11ᶜ being of cam shape as at 11ᵈ, such construction enabling the parts to compensate for wear and to effectively engage the rim portions of the split brake drum.

As a means of intermittently actuating and progressively advancing the circumferentially split brake drum 10 with each rebound of the vehicle spring and spring suspended vehicle, the pivoted clutch or rocker 11ᵇ is provided with a loop eye 11ᵉ, connected to a connecting strap 13, leading downwardly and connected to the axle 2 through the medium of a suitable axle clamp or clevis 14.

It will be understood that the inner and outer clutch members 11ª and 11ᵇ will simultaneously engage the brake drum and move the latter in one direction upon rebound of the spring supported vehicle body and will slide upon the inner and outer peripheries of the rim portions of the split brake drum when given a return movement for a new working impulse to check the rebound, and as a means of quickly returning the clutch to a new position for re-engagement with the brake drum, as upon the sudden compression of the vehicle springs in passing over an obstruction, a convolute spring 15, is provided, said spring 15 being connected at its inner end to a spacing and connecting collar 16, interposed between the bearing flanges of the companion members of the brake drum and the collar being secured by means of a cross pin or key upon the spindle 5. The outer end of the convolute spring 15 is provided with a loop eye 15ª, passing over a connecting pin 17, connected to the inner end of the clutch shank or guide stem 11.

Having thus described one of the embodiments of my invention, without having attempted to set forth all the forms in which it may be made, or all the modes of its use, what I claim and desire to secure by Letters Patent is,—

1. In a device of the character described, in combination with a circumferentially split brake drum, and a drum actuating clutch extending through and guided by the split portion of said brake drum, and a rocker clutch element intermittently engaging with the exterior of said drum and cooperating with said first mentioned clutch and intermittently engaging and releasing said brake drum.

2. In a device of the character described, a brake drum comprising complementary side sections spaced apart forming an intervening guide way, a spring resisted floating drum actuating clutch guided by said guide way and provided with a clutch engaging with the inner periphery of said brake drum, and a rocking clutch actuating element engaging with the outer periphery of said drum in cooperative relation to said inner clutch.

3. In a device of the character described, a brake drum comprising complementary inwardly flanged side sections spaced apart forming an intervening guide way, and a spring resisted floating drum actuating clutch extending in said guide way and provided with a relatively fixed clutch member engaging with the inner periphery of said brake drum and carrying a rocking element engaging with the outer periphery of said drum in cooperative relation to said fixed clutch member.

4. In a device of the character described, in combination with a circumferentially split brake drum, a drum actuating clutch comprising a guide extending through the split portion of said brake drum and provided with a clutch element slidable within and intermittently engaging said brake drum, and a pivoted cam shaped clutch on said guide cooperating with said inner clutch element in intermittently engaging and releasing said brake drum.

5. In a device of the character described, a brake drum comprising complementary side sections spaced apart forming an intervening guide way, a drum actuating clutch extending in said guide way and provided with relatively fixed and movable abutments engaging with the inner and outer peripheries of said brake drum, and resilient means within said brake drum for returning said clutch members for a new working impulse with respect to advancement of said brake drum by said clutch.

6. In a device of the character described, in combination with a circumferentially split brake drum, a drum actuating clutch extending through the split portion of said brake drum and provided with a fixed element intermittently engaging with the inner periphery of said brake drum, and a pivoted clutch intermittently engaging with the exterior of said drum in cooperative relation to said fixed clutch element in intermittently engaging and releasing said brake drum.

7. In a device of the character described, a carrying block provided with a rotatably mounted split brake drum, a brake shoe in engagement with the latter, and a spring resisted oscillatory clutch guided by said drum and movable relatively of and with the latter in opposite directions, said clutch including a guide provided with a relatively fixed clutch on the inner periphery of said drum and a pivoted cam clutch engaging the outer periphery of said drum in cooperative relation to said fixed clutch member.

8. In combination with a bearing block carrying a circumferentially split brake drum and a drum supporting spindle, a floating drum actuating clutch arranged within and guided by the circumferentially split portion of said brake drum and provided with relatively fixed and movable clutch elements intermittently engaging and disengaging with the inner and outer peripheries of said brake drum, and a convolute spring connected to said drum supporting spindle and said floating drum actuating clutch whereby the latter is returned for a new working impulse.

In testimony whereof I hereby affix my signature.

JOSEPH B. HARRIS.